Patented Dec. 2, 1941

2,265,051

UNITED STATES PATENT OFFICE 2,265,051

MOTOR FUEL

Chester E. Adams, Highland, Ind., assignor to Standard Oil Company, Chicago, Ill., a corporation of Indiana No Drawing. Application September 27, 1939,
Serial No. 296,813

12 Claims. (Cl. 44—9)

This invention relates to a new composition of matter that is capable of use for various purposes, and particularly for use as antioxidants in motor fuels, especially motor fuels of cracked hydrocarbon distillates.

The new compounds which are the subject of the present invention are obtained by reacting an aldehyde or a ketone with an organic polyamino compound having at least three amino nitrogen atoms, two or more of which are primary nitrogen atoms. More specifically the products are formed by reacting a compound having the general formula

in which R may be an aliphatic, aryl, aralkyl, alkaryl, cycloaliphatic or heterocyclic radical and R' may be hydrogen, an aliphatic, aryl, aralkyl, alkaryl, cycloaliphatic or heterocyclic radical with an organic polyamino compound having at least three amino nitrogen atoms, of which two or more are primary nitrogen atoms. Examples of the aldehydes or ketones which may be employed in the condensation are crotonaldehyde, butyraldehyde, heptaldehyde, methyl hexyl-ketone, furfural, acetaldehyde, isobutyraldehyde, acetophenone, benzaldehde, acetone, vanillin, valeraldehyde, octyl aldehyde, cinnamaldehyde, hexone, diisobutyl ketone and the like. Examples of the organic polyamino compounds which may be employed are diethylene triamine, triethylene tetramine, tripropylene tetramine, tetraethylene pentamine, triamino butane, triamino propane, tetramino pentane, tetramino butane and the like.

The compounds may be prepared by slowly adding the polyamino compound to a solution of the aldehyde or ketone and the compounds recovered by removing the solvent, and water which may be present, by any suitable means. Suitable solvents are ether, benzene, alcohol and hexane, although other solvents may be used. The compounds may also be prepared by passing the vapors of the aldehyde or ketone and the polyamine compound into benzene and subsequently reducing the lower layer to remove water, benzol, etc. While it is preferable to add the finished compound to the fuel as such, or in solution in some suitable solvent it is of course possible to form it in situ in the fuel by adding the reagents to the fuel, and subsequently removing any water resulting from the reaction. The preparation of these compounds is illustrated by the following examples, which are merely illustrative of the invention and not intended to be a limitation thereof.

EXAMPLE 1—*Preparation of butyraldehyde-diethylene triamine condensation product*

One mol of diethylene triamine is added slowly to an ether solution of two or more mols of butyraldehyde and the mixture agitated until no further temperature rise is noted. After settling the ether layer is separated from the lower layer, washed with water and dried over anhydrous Na₂CO₃. The dried ether layer is then freed of ether by suitable means, such as by distillation and a clear substantially water-white oil obtained.

The butyraldehyde triethylene tetramine condensation product is obtained in substantially the same manner as the above product, the cut is a light yellow oil instead of an almost water-white oil.

EXAMPLE 2—*Benzaldehyde-triethylene tetramine condensation product*

One mol of triethylene tetramine is added to a suspension of benzaldehyde in aqueous Na₂CO₃ solution and the resulting mixture well shaken. After completion of the reaction which takes place in a few minutes, the product of reaction, which is a water insoluble heavy oil, is taken up in ether. The ether solution is separated from the aqueous layer and cooled to about 0° F. at which temperature a crystalline product is obtained. The crystalline product is then filtered out and dried.

I have not been able to determine the structures of the reaction products obtained, but believe them to be mixtures of the condensation product since the determined molecular weights are greater than the calculated molecular weight, assuming the reaction product to be a single compound. Although I do not definitely know the exact structures of these compounds, it is believed that the reaction product may be a mixture of compounds probably having the following structures, using the reaction product of triethylene tetramine and an aldehyde,

as the example,

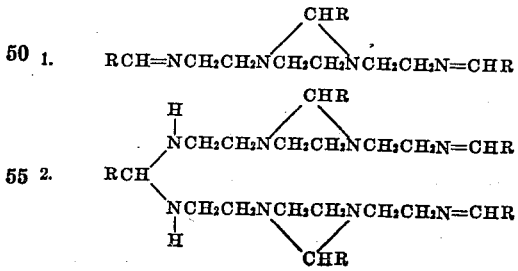

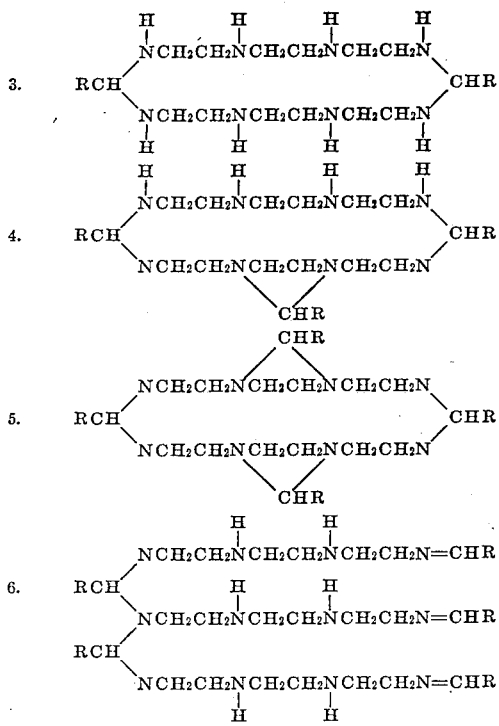

and other similar compounds. It is to be understood that the foregoing formulae are given merely as examples of the possible structures of the constituents of the reaction products obtained when a polyamino compound of the type defined is chemically condensed with an aldehyde or ketone, and I do not intend to be held to any explanation or theory which I may expound with regard thereto.

The condensation products of the present invention are particularly useful as gum inhibitors for use in cracked gasolines or hydrocarbon motor fuel distillates of the type which are normally unstable, particularly with respect to gum formation on storage. It has been customary to treat motor fuels of this type with substances such as strong sulphuric acid, fuller's earth and the like to remove these gum-forming constituents. Such treatments remove a substantial amount of the unsaturated constituents in the gasoline, and since these unsaturated constituents are partly responsible for the high antiknock properties of cracked gasoline, it is apparent that such treatment destroys some of the desirable qualities of cracked gasolines. In addition, these treatments result in a loss in volume of motor fuel. Although acid and/or clay treatment of motor fuels removes to some extent the gum forming constituents, it is often necessary to further enhance the stabilization of such fuels by the addition of antioxidants, while most of the commercial antioxidants for this purpose are effective in inhibiting gum formation they possess the highly undesirable property of being color unstable, and discolor the fuel to which they are added. Obviously this is highly detrimental to water-white fuels. The condensation products of the present invention are highly color-stable and hence do not depreciate the color of the fuel to which they are added.

In the manufacture of cracked motor fuels it is often necessary to store the sour distillate prior to sweetening. Since the stored sour distillates tend to form gum it is often desirable to add an antioxidant to such stocks. However, since most of the present commercial gum inhibitors are of the phenolic type they are therefore removed during the subsequent sweetening operations, necessitating the further addition of antioxidant to the sweetened distillate. It is highly desirable therefore to have a gum inhibitor which is not affected by the sweetening operation. The condensation reaction product of an aldehyde or a ketone with a polyamino compound having at least three amino nitrogen atoms, at least two of which are primary nitrogen atoms, contain no acidic groups and are therefore not extracted or removed by sweetening operations. This makes them highly useful in stabilizing untreated or sour distillates which are to be stored for appreciable periods before being sweetened.

The amount of these inhibitors employed to stabilize a cracked gasoline will vary with the particular cracked gasoline to be treated but, in general, the amount of the inhibitor used will vary from 0.05 to 0.001%. With some motor fuels, the amount used will be as low as 0.0005%. Even in these small concentrations, the class of inhibitors herein disclosed have proven to be very effective as gum inhibitors in cracked gasoline.

The effectiveness of the inhibitors of the present invention in inhibiting gum formation and the inherent color stability of their inhibitors is demonstrated by the data in Table I. The data presented in this table were obtained in two storage tests at 90° F.; one to evaluate the gum inhibiting property of the class of compounds named herein, and the other to evaluate the color stability of the inhibitors. Test A made primarily for gum stability was made with an end-point cracked gasoline which had not been acid treated, and Test B, made primarily for color stability, was carried out in a sulfuric acid treated cracked gasoline.

*Table I*

| Sample | Test A, storage period 26 wks. | | | Test B, Saybolt color initial color +23 | |
|---|---|---|---|---|---|
| | Inhibitor | Saybolt color* | Mgs. gum | 19 wks. | 28 wks. |
| | Percent | | | | |
| Control | 0.002 | −2 | 10.0 | +22 | +20 |
| Control+butyraldehyde-diethylene triamine condensation product. | 0.002 | −2 | 2.7 | +22 | +21 |
| Control+butyraldehyde-triethylene tetramine condensation product. | 0.002 | −2 | 1.9 | +23 | +22 |
| Control+antioxidant A. | 0.002 | **1-½ | 2.8 | Orange | Orange |
| Control+antioxidant B. | 0.002 | **1-1½ | 3.7 | Pink | Very pink |

*Initial color +2 Saybolt.
**N. P. A.

Referring to the above table it will be noted that the condensation products of the present invention are effective not only in inhibiting gum formation, but are also effective in retaining the color of the gasoline. Antioxidants A and B are good commercial gum inhibitors but are themselves color unstable and cause a depreciation in the color of the fuel. Both samples of fuel containing antioxidants A and B went badly off color. In tests with inhibitors A and B the fuel darkened too much to be measured by the A. S. T. M. method for determining the color of fuels by the Saybolt chromometer.

The gum formed was determined by the A. S. T. M. method D 381–36 for determining the gum content of the gasoline. This test, which is described in detail in the September 1937 A. S. T. M. Standard on petroleum products and lubricants (page 181), is a means of determining the amount of gum existent at the time of test in the fuel.

The development of color in fuels was determined by the A. S. T. M. method D 156-35T which is described in detail on page 74 et seq. of the above publication. In this test the color of the fuel is measured by means of the Saybolt chromometer.

In addition to using the compounds indicated above as gum inhibitors in cracked gasoline, these agents may be used in blends of motor fuels containing substantial amounts of gum-forming cracked gasoline. In using the above mentioned compounds to retard gum formation in cracked gasolines, we prefer to add the inhibitor to fresh gasoline or prior to the formation of gum.

I claim:

1. A motor fuel product comprising cracked hydrocarbon distillates of the character of gasoline which normally tend to deteriorate and develop gum or color or both gum and color, said product containing a small proportion of the condensation product obtained by reacting a compound selected from the group consisting of aldehydes and ketones free of hydroxy substituents and having the general formula

in which R is a radical selected from the group consisting of aliphatic, aryl, aralkyl, alkaryl, cyclo aliphatic and heterocyclic radicals, and R' is a substituent selected from the group consisting of hydrogen, an aliphatic radical, an aryl radical, an aralkyl radical, an alkaryl radical, a cycloaliphatic radical and a heterocyclic radical, with an organic polyamine having at least three amino nitrogen atoms of which at least two are primary amino nitrogen atoms in quantities sufficient to retard the oxidation of said distillates.

2. A motor fuel product comprising cracked hydrocarbon distillates of the character of gasoline which normally tend to deteriorate and develop gum or color or both gum and color, said product containing a small proportion of the product resulting from the condensation of an aliphatic aldehyde and an alkylene polyamine having at least three amino nitrogen atoms, at least two of which are primary amino nitrogen atoms.

3. A motor fuel product comprising cracked hydrocarbon distillates of the character of gasoline which normally tend to deteriorate and develop gum or color or both gum and color, said product containing a small proportion of the product resulting from the condensation of an aromatic aldehyde free of hydroxy substituents and an alkylene polyamine having at least three amino nitrogen atoms, at least two of which are primary amino nitrogen atoms.

4. A motor fuel product comprising cracked hydrocarbons distillates of the character of gasoline which normally tend to deteriorate and develop gum or color or both gum and color, said product containing a small proportion of the product resulting from the condensation of butyraldehyde and diethylene triamine.

5. A motor fuel product comprising cracked hydrocarbon distillates of the character of gasoline which normally tend to deteriorate and develop gum or color or both gum and color, said product containing a small proportion of the product resulting from the condensation of butyraldehyde and triethylene tetramine.

6. A motor fuel product comprising cracked hydrocarbon distillates of the character of gasoline which normally tend to deteriorate and develop gum or color or both gum and color, said product containing a small proportion of the product resulting from the condensation of benzaldehyde and triethylene tetramine.

7. The method of preserving cracked hydrocarbon distillates of the character of gasoline which normally tend to develop gum on storage, which comprises incorporating therein a small proportion of the condensation product obtained by reacting a compound selected from the group consisting of aldehydes and ketones free of hydroxy substituents and having the general formula

in which R is a radical selected from the group consisting of aliphatic, aryl, aralkyl, alkaryl, cycloaliphatic and heterocyclic radicals, and R' is a substituent selected from the group consisting of hydrogen, an aliphatic radical, an aryl radical, an aralkyl radical, an alkaryl radical, a cycloaliphatic radical and a heterocyclic radical, with an organic polyamine having at least three nitrogen amino atoms of which at least two are primary amino nitrogen atoms, whereby the oxidation of said cracked hydrocarbon distillates is substantially inhibited.

8. The method of preserving cracked hydrocarbon distillates of the character of gasoline which normally tend to develop gum on storage, which comprises incorporating therein a small proportion of the product resulting from the condensation of an aliphatic aldehyde and an alkylene polyamine having at least three amino nitrogen atoms, at least two of which are primary nitrogen atoms.

9. The method of preserving cracked hydrocarbon distillates of the character of gasoline which normally tend to develop gum on storage, which comprises incorporating therein a small proportion of the product resulting from the condensation of an aromatic aldehyde free of hydroxy substituents and an alkylene polyamine having at least three amino nitrogen atoms, at least two of which are primary amino nitrogen atoms.

10. The method of preserving cracked hydrocarbon distillates of the character of gasoline which normally tend to develop gum on storage, which comprises incorporating therein a small proportion of the product resulting from the condensation of a butyraldehyde and diethylene triamine.

11. The method of preserving cracked hydrocarbon distillates of the character of gasoline which normally tend to develop gum on storage, which comprises incorporating therein a small proportion of the product resulting from the condensation of butyraldehyde and triethylene tetramine.

12. The method of preserving cracked hydrocarbon distillates of the character of gasoline which normally tend to develop gum on storage, which comprises incorporating therein a small proportion of the product resulting from the condensation of benzaldehyde and triethylene tetramine.

CHESTER E. ADAMS.